(12) United States Patent
Hand et al.

(10) Patent No.: US 11,364,691 B2
(45) Date of Patent: Jun. 21, 2022

(54) WEB CORE SANDWICH STRUCTURES

(71) Applicant: The Boeing Company, Chicago, IL (US)

(72) Inventors: Michael Leslie Hand, Huntington Beach, CA (US); Juan Carlos Guzman, Manson, WA (US)

(73) Assignee: The Boeing Company, Chicago, IL (US)

( * ) Notice: Subject to any disclaimer, the term of this patent is extended or adjusted under 35 U.S.C. 154(b) by 35 days.

(21) Appl. No.: 16/683,119

(22) Filed: Nov. 13, 2019

(65) Prior Publication Data
US 2021/0138745 A1     May 13, 2021

(51) Int. Cl.
| | | |
|---|---|---|
| *B29C 70/52* | (2006.01) | |
| *B29C 65/48* | (2006.01) | |
| *B64C 3/20* | (2006.01) | |
| *B29L 31/30* | (2006.01) | |

(52) U.S. Cl.
CPC .............. *B29C 70/52* (2013.01); *B29C 65/48* (2013.01); *B29K 2995/0096* (2013.01); *B29L 2031/3076* (2013.01); *B64C 3/20* (2013.01)

(58) Field of Classification Search
CPC ....... B29C 65/48; B29C 70/52; B29C 70/543; B29K 2995/0096; B29L 2031/3076; B64C 3/20
See application file for complete search history.

(56) References Cited

U.S. PATENT DOCUMENTS

| | | |
|---|---|---|
| 8,951,375 B2 | 2/2015 | Havens et al. |
| 2014/0034236 A1 | 2/2014 | Guzman et al. |
| 2015/0298423 A1 | 10/2015 | Holemans |
| 2016/0237836 A1 | 8/2016 | Harris |
| 2018/0194096 A1 | 7/2018 | Martial Somda et al. |
| 2018/0229443 A1 | 8/2018 | Pham et al. |
| 2018/0311913 A1 | 11/2018 | McCarville et al. |
| 2019/0202163 A1 | 7/2019 | Yeh et al. |
| 2021/0061495 A1 | 3/2021 | Aston et al. |

FOREIGN PATENT DOCUMENTS

| | | |
|---|---|---|
| CN | 106694884 A | 5/2017 |
| CN | 109317677 A | 2/2019 |
| EP | 3034208 A1 | 6/2016 |

OTHER PUBLICATIONS

Gardiner, Ginger, ""Smart tooling" cut time and risk for complex unitized composite structures production", CompositesWorld, dated Feb. 5, 2016, 8 pages.
Zhang, Xiaoyu et al. "Vibration tests of 3D printed satellite structure made of lattice sandwich panels." AIAA Journal 56.10 (Oct. 1, 2018): 4213-4217.
European Patent Office, Extended European Search Report regarding European Patent Application No. 20189687.5, dated Feb. 1, 2021, 11 pages.

*Primary Examiner* — Lawrence D Ferguson
(74) *Attorney, Agent, or Firm* — Kolisch Hartwell, P.C.

(57) ABSTRACT

A panel is disclosed, including a first facesheet, a second face sheet, and a plurality of pultrusion-formed web structures. Each web structure has a middle support portion, a first end portion, and a second end portion. The first end portion of each web structure is attached to the first facesheet and the second end portion of each web structure is attached to the second facesheet. The middle support portion, first end portion, and second end portion of each web structure form a single monolithic structure.

20 Claims, 4 Drawing Sheets

WEB CORE SANDWICH STRUCTURES

FIELD

This disclosure relates to systems and methods for sandwich structures. More specifically, the disclosed examples relate to sandwich structures with web core and methods of manufacture.

INTRODUCTION

Composite materials are becoming prevalent in a variety of applications. These materials offer improved strength to weight ratios over conventional materials, among many other advantages. One class of composite materials is sandwich-structure composites, which include a core material between two thin skins. Fluted core sandwich-structure composite materials are particularly useful for applications involving oriented loading.

In fluted core sandwich structures, a plurality of elongate hollow stiffeners or flutes are aligned in parallel between two facesheets. Curved corners of the flutes offer better structural properties, but result in a void space along each corner, between the flutes and the adjacent facesheet. This void space is filled with a material designed to provide mechanical support to the flutes and facesheet and reduce distortion during curing of the structure. The filler material is commonly referred to as a radius filler or noodle and may be formed from a composite tape or similar materials.

Fluted core sandwich structures can be expensive and labor intensive to manufacture. Composite flutes require mandrel wrapping and careful placement of individual ply ends. Also, the flutes and noodles are separately produced, and layup of the individual pieces can be a time-consuming and exacting process.

SUMMARY

The present disclosure provides systems, apparatuses, and methods relating to web core sandwich structures. In some examples, a panel may include a first facesheet, a second face sheet, and a plurality of pultrusion-formed web structures. Each web structure may have a middle support portion, a first end portion, and a second end portion. The first end portion of each web structure may be attached to the first facesheet and the second end portion of each web structure may be attached to the second facesheet. The middle support portion, first end portion, and second end portion of each web structure may form a single monolithic structure.

In some examples, a pultrusion formed web structure may include a middle support portion which has uniform thickness. The web structure may further include a first foot portion and a second foot portion flaring outward from opposite ends of the middle support portion. The middle support portion and the first and second foot portions may form a single continuous monolithic unit.

In some examples, a method of manufacturing a sandwich panel may include pultruding a plurality of composite web structures. Each web structure may have a middle support portion, a first flared end portion, and a second flared end portion. Each of the first and second end portions may have a continuous faying surface. The method may further include joining the faying surface of the first end portion of each web structure to a first facesheet, and joining the faying surface of the second end portion of each web portion to a second facesheet.

Features, functions, and advantages may be achieved independently in various examples of the present disclosure, or may be combined in yet other examples, further details of which can be seen with reference to the following description and drawings.

DETAILED DESCRIPTION

Figure 1:
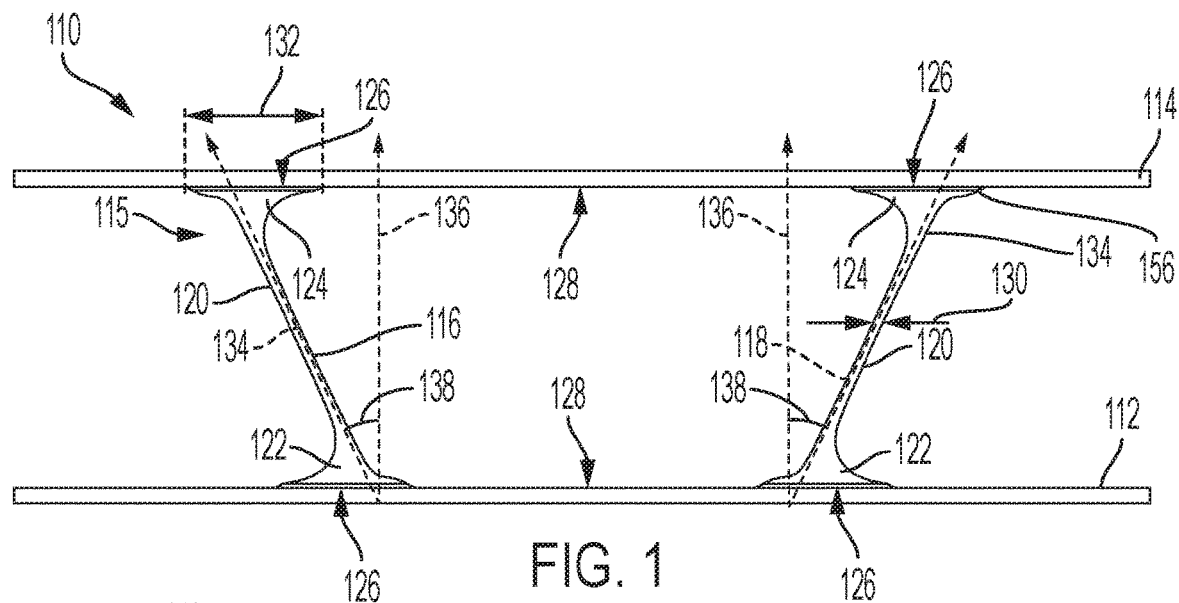
FIG. 1 is an elevation view of a portion of an illustrative web core sandwich structure in accordance with aspects of the present disclosure.

Various aspects and examples of a sandwich structure or material having a web core, as well as related methods, are described below and illustrated in the associated drawings. Unless otherwise specified, a web core sandwich structure in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, which are labeled accordingly.

Overview

In general, a web core sandwich structure in accordance with the present teachings includes first and second facesheets joined by a plurality of separate web structures. Each web structure is joined to the first facesheet and to the second facesheet. The plurality of web structures may be collectively described as a core of the sandwich material.

Each facesheet may comprise a thin layer of material having high stiffness. Each facesheet may include any appropriately stiff material or materials, such as metal or plastic. Composite materials such as fiber reinforced plastics and/or laminates may provide desired stiffness with minimal weight. The facesheets may also be described as sheets, skin layers, skins, and/or facings.

Each web structure may comprise a pultruded composite material. The pultruded composite material may be formed from a plurality of lengths of composite tape, plies of a composite material, fiber tows, and/or film adhesives. The tape, plies, tows, and/or adhesives may be pressed against one another and/or joined by a matrix material as part of a pultrusion process. The pultrusion process may utilize a die configured to allow pultrusion of a desired cross-sectional shape, with multiple lengths of composite material in any desired relative orientation. Pultrusion of each web structure may be performed in a single pass.

Each web structure may include reinforcing fibers in a matrix material such as a resin, which may be described as a prepreg material. The composite tape, plies, and/or tows may each comprise a prepreg material. The web structure may be pultruded such that the reinforcing fibers are oriented to produce a desired material property field of the web. Fibers of a film adhesive pultruded with the web may also allow tailoring of local material properties. Curing of the pultruded composite material of each web structure may fuse the prepreg layers of the web structure, and produce a monolithic web structure. That is, each web structure may consist of a single unit formed or composed of material without joints or seams. Each web structure may also be described as unitary or as a single piece.

Each web structure may include a main support portion, defining a primary web axis. The primary web axis may be perpendicular to a pultrusion direction or longitudinal extent of the web structure. Each web structure may further include a foot portion at each of first and second opposing ends of the main support portion. The main support portion may flare out to the foot portion at each end. Each foot portion may include a faying surface, configured for attachment to a facesheet.

Each web structure may be pultruded with a consistent cross-sectional shape, perpendicular to the pultrusion direction. An uncured and/or partially cured composite material, such as a B stage prepreg material, may be used in pultruding each web structure. The structure may therefore remain flexible until cured further, allowing curvature to be introduced in two dimensions along the longitudinal extent of the web structure. For instance, a web structure may be laid onto a curved facesheet, and conform to the curvature of the facesheet. In some examples, the web structures may be heated and/or otherwise conditioned to slightly reduce flexibility in order to improve handling. Handling and/or assembly of the web structure may be performed at any stage of cure, from green or A stage, to partially cured, B or C stages, to fully cured, and/or any point in between, according to desired properties of the web structures during handling.

When assembled into the sandwich structure, each web structure may extend between the first and second facesheets. The faying surface of a first of the foot portions may be joined to the first facesheet and the faying surface of a second of the foot portions may be joined to the second facesheet. Each web structure may be joined to the facesheets by any effective means. For example, a faying surface may be contacted with an inner surface of the corresponding facesheet and the web structure and facesheet may be cured together. For another example, an adhesive may be applied to a faying surface as part of the pultrusion of the web structure, or subsequent to the pultrusion of the web structure.

Each web structure may be described as extending at an oblique angle relative to the facesheets. That is, the primary web axis of each web structure may be off-normal and/or off-radial relative to the facesheets. Each primary web axis may form a web angle with a normal or radial direction of the facesheets. The web angle of each web structure may be selected according to desired structural properties of the web core sandwich structure and/or expected loading of the sandwich structure. Each pair of adjacent web structures may have equal and opposite web angles. That is, each pair of adjacent web structures may be described as having reflective symmetry, as having alternating angles, and/or as alternating between left-handed and right-handed web structures. In some examples, the web angle may vary across the sandwich structure, for instance to correspond to non-uniform loading.

During assembly of the web structures and facesheets into the web core sandwich structure, joining of the web structures to the facesheets, curing of the web structures and/or facesheets, and/or other such steps in manufacture of the web core sandwich structure, the web structures may be supported by a plurality of elongate tooling such as mandrels, bladders, or spacers. The tooling may be shaped such that the web structures are supported in a desired geometric configuration. For example, the tooling may have an isosceles trapezoidal cross-sectional shape such that the web structures extend at alternating web angles as described above.

The tooling may comprise any desired material and/or mechanism. For example, the tooling may include an inflatable bladder. For another example, the tooling may include a shape memory polymer material. At room temperature and/or an expected assembly temperature, such tooling may have a permanent shape configured to support the web structures in the desired geometric configuration. Above a transition temperature, such tooling may be deformable to a temporary shape to allow removal from the web core sandwich structure. A shape memory polymer material of the tooling may be selected to have a transition temperature above or below a cure temperature of the web structures, depending on a method of manufacture of the web core sandwich structure.

The fiber orientation, angle, and/or other properties of the web structures may be configured to result in desired properties of the web core sandwich structure. For example, the sandwich structure may be configured to prioritize a direct load path through the foot portions of the web structures into the facesheets or may be configured to maximize adhesion of the web structures to the facesheets. For another example, the fiber orientation of an interface portion of the web structures may be configured to match a fiber orientation of composite facesheets. Desired properties and/or configuration of the sandwich structure may depend on an intended application and associated expected loading of the structure.

The separate or independent web structures of the web core sandwich structure may reduce weight and allow additional design flexibility as compared to tubular-structure-based cores such as a fluted core. For instance, weight associated with inboard and outboard flute walls may be eliminated. For another instance, web angles and spacing between webs may be varied across a web core sandwich panel, allowing complex shapes such as a panel for an ogive fairing.

Examples, Components, and Alternatives

The following sections describe selected aspects of exemplary sandwich structure panels as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Sandwich Structure Panels

As shown in FIGS. 1-8, this section describes an illustrative web core sandwich structure and multiple examples of alternative and/or additional features. Each discussed sandwich structure is an example of a web core sandwich structure, as described above.

FIG. 1 is a side view of a portion of an illustrative sandwich panel 110. The panel includes an inboard facesheet 112 and an outboard facesheet 114. The facesheets may also be referred to as first and second or upper and lower facesheets, depending on an orientation of sandwich panel 110. In the present example, the sandwich panel is reversible and the inboard and outboard facesheets are interchangeable. In some examples, sandwich panel 110 may have directionality. For example, the panel may form a wall of a tank, with inboard facesheet 112 facing an interior of the tank and outboard facesheet 114 forming an exterior of the tank.

Each facesheet 112, 114 may be thin relative to an overall thickness of sandwich panel 110 and comprised of any sufficiently stiff material and/or materials. In the present example, each facesheet is a planar sheet of a composite laminate material. The facesheets may be manufactured separately and assembled into the sandwich panel, or may be partially and/or fully manufactured as part of the method of manufacturing the sandwich panel.

Sandwich panel 110 further includes a core comprising a plurality of web structures 115. Of the plurality of web structures, a pair of adjacent web structures are depicted, including a first web 116 and a second web 118. The following description of first web 116 and second web 118 may be understood to apply similarly to the remaining web structures of the plurality of web structures. First web 116 may be described as a left-handed web and second web 118 may be described as a right-handed web, as described further below. Each pair of adjacent web structures of the plurality of web structures 115 includes a left-handed web and a right-handed web.

Each of webs 116, 118 includes a main support portion or leg 120. The leg tapers out to form an inboard foot 122 at a first end and an outboard foot 124 at a second, opposing end. Each foot 122, 124 has a distal or faying surface 126. The faying surfaces of inboard feet 122 of webs 116, 118 are joined to an inner surface 128 of inboard facesheet 112. The faying surfaces of outboard feet 124 of the webs are joined to an inner surface 128 of outboard facesheet 114.

Faying surfaces 126 are continuous and contoured to match inner surface 128 of the corresponding facesheet. That is, each faying surface 126 may be configured to conform to the adjacent facesheet. The faying surfaces may be joined to the facesheets in any effective manner. For example, the faying surfaces may be bonded to the facesheets with an adhesive, or matrix material in the faying surfaces and facesheets may join during curing. Faying surfaces 126 may be in direct contact with inner surfaces 128 of the facesheets and/or may be separated by a material such as an adhesive.

Webs 116, 118 each flare from a web thickness 130 in leg 120 to a foot width 132 at faying surfaces 126. The foot width may be the same for each foot, as depicted, or may differ between inboard foot 122 and outboard foot 124. The feet may have a filleted, blended, chamfered, and/or any appropriate flared shape.

Leg 120 of each web 116, 118 defines a primary web axis 134 of the web. Webs 116, 118 are inclined relative to a normal direction 136 of facesheets 112, 114. Each primary web axis 134 forms a web angle 138 with normal direction 136. First web 116 has a web angle of positive α, and second web 118 has a web angle of negative α. First web 116 may accordingly be described as a left-handed web and second web 118 may be described as a right-handed web. The first and second webs may be identically manufactured and then flipped in orientation when assembled into sandwich panel 110, to create left and right-handed webs.

Angle α may be any effective angle. Preferably, angle α may be selected to provide optimum structural performance of sandwich panel 110. For many applications, an angle between 12 and 28 degrees may result in the best performance. For some applications such as those involving highly directional loading, an angle between 10 and 30 degrees may result in the best performance. Each web structure of the plurality of web structures 115 of the panel core may have a web angle 138 of plus or minus α. For a planar, isotropic panel such as the present example of sandwich panel 110, use of a consistent web angle may ensure optimum performance at all locations on the panel. In some examples, such as panels having complex geometries or being configured for non-uniform loading, web angle 138 may vary across the panel in order to achieve optimum structural performance.

Figure 2:
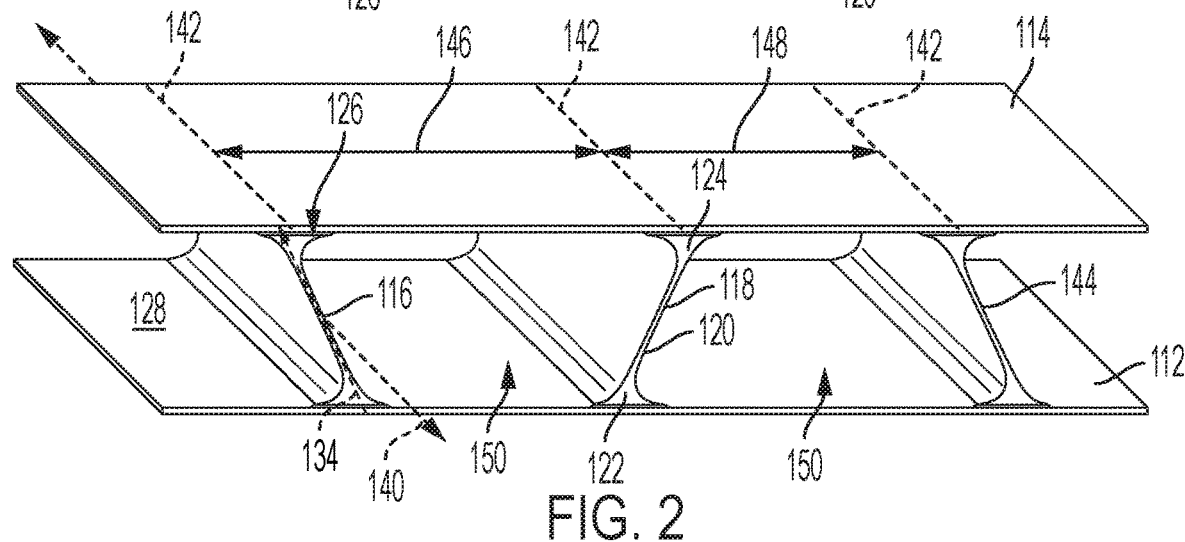
FIG. 2 is an isometric view of the sandwich structure of FIG. 4.

As shown in FIG. 2, each web 116, 118 has a longitudinal web axis 140, which may correspond to a pultrusion direction when forming the web. In the present example, each leg 120 is linear in cross-section and planar in extent. Primary web axis 134 is parallel to the cross-sectional linear extent of the leg, and longitudinal web axis 140 is perpendicular to the primary web axis, in the plane of the leg. In some examples, the legs may have a curved cross-section. In such examples, the axes may be understood to coincide with a general average extent of the leg. In some examples, the legs may curve and/or twist along longitudinal web axis 140. In such examples, primary web axis 134 may be understood as locally defined at each cross-section of the leg, and varying continuously along the length of the web.

Each web 116, 118 may be described as joined to facesheets 112, 114 along joinder lines 142. Each joinder line 142 is parallel to longitudinal web axis 140 of the corresponding web. In FIG. 2, joinder lines between outboard foot 124 of first web 116 and outboard facesheet 114, and between outboard foot 124 of second web 118 and outboard facesheet 114 are depicted. A third web 144 is also shown, including a joinder line between outboard foot 124 of the third web and outboard facesheet 114. The third web is a left-handed web, matching first web 116.

Joinder line 142 of first web 116 to outboard facesheet 114 is spaced from the joinder line of second web 118 to the outboard facesheet by a first distance 146. The joinder line of the second web to the outboard facesheet is spaced from the joinder line of third web 144 to the outboard facesheet by a second distance 148. First distance 146 is greater than second distance 148. Distances 146, 148 may depend on an expected primary load type and/or intensity. For example, a panel configured to withstand primarily bending loads may have shorter distances 146, 148 than a panel configured to withstand primarily shear loads.

Joinder lines 142 of adjacent webs may alternate between spacing by first distance 146 and second distance 148. That is, on each facesheet the distance between the joinder lines of adjacent webs may alternate between the first and second distances. Also, for each pair of adjacent webs the distance between joinder lines on one of facesheets 112, 114 may be first distance 146 and the distance between joinder lines on the other facesheet may be second distance 148.

Each pair of adjacent web may also be described as forming opposite sides of a trapezoidal compartment or core cavity 150 between inboard facesheet 112 and outboard facesheet 114. The orientation of the trapezoidal shape of the core cavities may alternate. As shown in FIG. 2, core cavity 150 between first web 116 and second web 118 is the same size but has an inverted orientation relative to core cavity 150 between second web 118 and third web 144.

Figure 3:
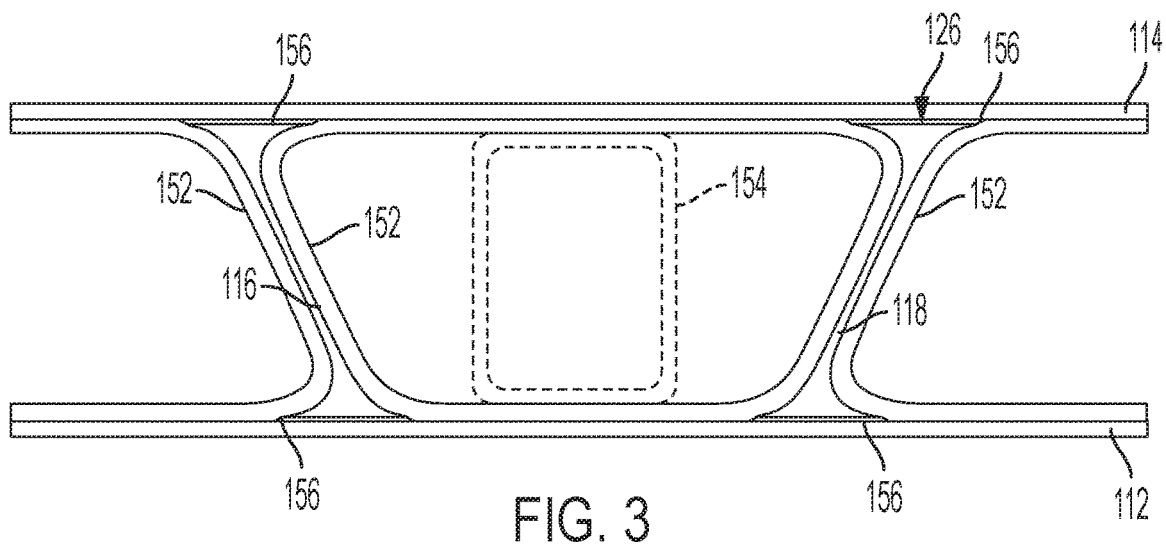
FIG. 3 is an elevation view of a portion of an illustrative intermediate sandwich assembly for manufacture of the sandwich structure of FIG. 4, including a plurality of shape-memory spacers.

During assembly of sandwich panel 110, core cavities 150 may be filled by tooling configured to support the plurality of web structures 115. As depicted in FIG. 3, in the present example, each core cavity is filled by a shape memory polymer spacer 152 during assembly and curing of sandwich panel 110. Any tooling may be used, but shape memory polymers may allow for easy removal even in difficult geometries such as contoured or necked profiles.

Spacer 152 may be configured to act as a mandrel or as a bladder during production of sandwich panel 110. For a spacer configured to act as a mandrel, a shape memory polymer which has a transition temperature greater than a cure temperature of the plurality of web structures 115 and/or of sandwich panel 110 may be selected. For example, a polymer with a transition temperature above 300 degrees Fahrenheit may be selected. The spacer may therefore remain rigid through layup and curing of the panel. Heat may be applied directly to the spacer after curing, to raise the temperature of the spacer above the transition temperature and render the spacer flexible. The spacer may then be twisted, flexed, or otherwise manipulated to facilitate removal from the sandwich panel.

For a spacer configured act as a bladder, a shape memory polymer which has a transition temperature at or below a cure temperature of the plurality of web structures 115 and/or of sandwich panel 110 may be selected. For example, a polymer with a transition temperature of approximately 180 degrees Fahrenheit may be selected. The spacer may therefore become flexible during the curing process. Such a spacer may have open ends, to allow air pressure from curing equipment such as an autoclave to maintain the shape of the spacer during curing. Once curing is complete, and before spacer 152 has cooled, the spacer may be twisted, flexed, or otherwise manipulated to facilitate removal from the sandwich panel.

Each spacer 152 may closely conform to the adjacent web structures and facesheets 112, 114. The spacers 152 may have any appropriate shape or shapes, and any appropriate internal structure. In the depicted example, each spacer has an approximately trapezoidal cross-sectional shape, with planar faces and rounded corners. Each spacer is elongate and tubular, with a single wall defining a hollow interior. In some examples, each spacer may have a different shape, may have curved faces, and/or multiple spacers may be configured to occupy a single core cavity.

In some examples, spacers 152 may include reinforcing internal structures. For example, a rectangular tubular member 154 may be fixed to an inner side of each of outboard and inboard faces of the depicted spacer, as shown in dashed lines in FIG. 3. Such a reinforcement may increase stiffness or improve other structural properties of the spacer, while allowing the walls of the spacer to remain thin, thereby retaining desirable flexibility of the shape memory polymer material.

Layup and curing of sandwich panel 110 may be performed according to any effective method. An illustrative method is discussed below, with reference to the flow chart of FIG. 9. Each method may include attaching the plurality of web structures 115 of the core of sandwich panel 110 to inboard facesheet 112 and outboard facesheet 114. The web structures may be attached by any effective means.

Figure 4:
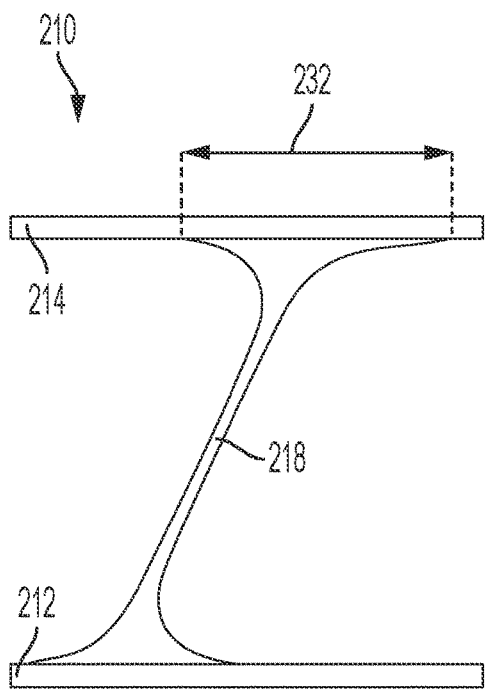
FIG. 4 is an elevation view of a portion of another illustrative web core sandwich structure, having an increased foot width.

In some examples, such as the example depicted in FIG. 4, facesheets 112, 114 and the plurality of web structures 115 may be co-cured. That is the web structures may be assembled with faying surfaces 126 in direct contact with inner surfaces 128 of the facesheets. The assembled sandwich panel may then be cured, the curing process joining the web structures to the facesheets. Prior to such co-curing, the web structures and the facesheets may be un-cured and/or may be partially cured.

In some examples, such as the example depicted in FIGS. 1-3, web structures 115 may be bonded to facesheets 112, 114 with an adhesive 156. For example, the web structures may be pultruded with a layer of adhesive on each faying surface 126. When the plurality of web structures 115 are assembled with facesheets 112, 114 into sandwich panel 110, adhesive 156 may contact inner surfaces 128 of the facesheets. The adhesive may be cured with the composite materials of web structures 115 and facesheets 112, 114 and/or may be otherwise cured or set. For instance, adhesive 156 may be allowed to dry and/or return to room temperature from a refrigerated state.

Different means of attaching web structures 115 to facesheets 112, 114 may offer different advantages, and therefore be desirable for manufacturing sandwich structures intended for different applications and/or for manufacturing sandwich structures by different methods. For example, co-curing may be advantageous in a highly automated manufacturing method where web structures are pultruded directly onto one of the facesheets, while adhesive bonding may be advantageous when pultruding web structures separately and storing before layup. A film adhesive, such as a film adhesive supported by a cloth carrier, may allow fine adjustments in the volume, geometry, and/or composition of areas of web structures 115 such as faying surfaces 126 and/or feet 122, 124.

Properties of the attachment and/or interface between faying surfaces 126 of the web structures and inner surfaces 128 of the facesheets may affect response of sandwich panel 110 to loading. For example, the degree of load transfer from web 118 into outboard facesheet 124 may be related to foot width 132, shown in FIG. 1. That is, increasing foot width 132 may improve load transfer. In sandwich panel 110, web 118 is attached to outboard facesheet 124 by an adhesive and optimized for web strength over adhesion. The strength of web 118 may facilitate effective load transfer to the outboard facesheet. Accordingly, sufficient load transfer can be achieved with a small foot width 132.

FIG. 4 shows another illustrative sandwich panel 210 with a web 218 between an inboard facesheet 212 and an outboard facesheet 214. Web 218 is in direct contact with outboard facesheet 214 and attached by co-curing. The web is therefore optimized for adhesion to increase separating load tolerance of the sandwich panel. Accordingly, a foot width 232 of web 218 is greater than foot width 132 of web 118, to improve load transfer between web 218 and outboard facesheet 214.

Figure 5:
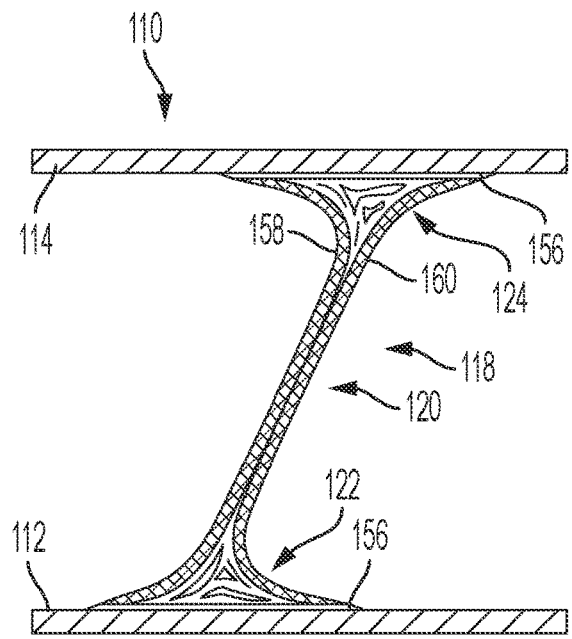
FIG. 5 is a cross-sectional view of a portion of the sandwich structure of FIG. 4, depicting the pultruded composite structure of a web.

FIG. 5 is a cross-sectional view of web 118, depicting the pultruded composite structure of the web. The pultruded composite structure may be configured to create desired properties of web 118, such as optimization for strength or adhesion as described above. Web 116 and each web structure of the plurality of web structures 115 of the core (see FIG. 1) may be pultruded with a similar composite structure. The following description of web 118 may be understood to apply similarly to each web structure.

Web 118 is pultruded from a plurality of lengths of composite material such as tape. The web may also include additional materials such as fabric or tows. In some examples, an adhesive such as film adhesive may be pultruded with the web. A film adhesive may be supported or unsupported by a carrier material such as a light open-weave fabric. A carrier may facilitate handling and/or improve strength of a joint which includes the film adhesive, by contributing to strength and/or stiffness characteristics of bondline of the joint. A carrier may also improve bondline thickness control, and allow fiber content to be incremented in small volumes that might otherwise be difficult to fill or reinforce.

In the depicted example, web 118 comprises a plurality of lengths of composite tape, pultruded in a single pass. The following description may also apply to lengths of other materials such as fabric, tows, and/or film adhesives. In the pultrusion process, the lengths of tape are fed through a forming die configured to compress the lengths of tape together into the desired form of the web. After pultrusion and prior to curing, the web may be flexible and allow introduction of curvature along the longitudinal extent of the web. Once the web has been partially and/or fully cured, the pultruded tapes may be described as forming a single monolithic web structure.

The plurality of lengths of composite tape may be in face-to-face contact with one another, in direct face-to-face contact with one another, in intimate contact with one another, and/or pressed against one another within the pultruded web. Each of the plurality of lengths of composite tape may include a plurality of lengths of reinforcing fibers and a resin material. The lengths of reinforcing fibers within a given length of tape are generally oriented in a fiber orientation direction, which may also be referred to as a fiber axis direction and/or as a fiber axis.

The reinforcing fibers of a given length of tape may be oriented, or oriented generally, along and/or parallel to a fiber axis direction. The given length of tape also may define a longitudinal axis, which may be at least substantially parallel to longitudinal web axis 140 (see FIG. 2) of web 118, once the lengths of composite tape are formed into web 118. The fiber axis direction may be parallel to the longitudinal web axis and/or oriented at a fiber angle with respect to the longitudinal web axis.

The reinforcing fibers also may be oriented to form a two-dimensional arrangement within a given length of tape. Examples of such a 2-dimensional arrangement include a mesh, a woven structure, a cloth, and/or a random array of reinforcing fibers. The reinforcing fibers may form a three-dimensional arrangement within a given length of tape. Examples of such a three-dimensional arrangement include a mesh, a woven structure, a cloth, a random array of reinforcing fibers, and/or two or more two-dimensional arrangements of reinforcing fibers that are stacked on top of one another.

The plurality of lengths of composite tape may include any suitable number of lengths of tape. In some examples, the number of lengths of composite tape may vary along the length of web 118, for instance to produce desired variations in the thickness of the web or variations in properties of a constant thickness web. The plurality of lengths of composite tape within web 118 may be oriented such that lengths of tape are not coplanar with one another. Additionally or alternatively, the plurality of lengths of composite tape may be oriented such that at least one length of tape is in direct physical contact with another length of tape but not coplanar with the other length of tape. For example, a first length of tape may be oriented at a skew angle with respect to a second length of tape.

In some examples, web 118 may be formed solely and/or exclusively of lengths of composite tape. For instance, web 118 may not include a separate resin material and/or thermoplastic resin material that extends between and/or separates the plurality of lengths of composite tape from one another. Each composite tape may comprise a prepreg composite material, having resin infused around reinforcing fibers.

In web 118, the relative orientation of the various lengths of composite tape and/or the fiber axis direction of a given length of tape may be selected based upon a material property field of inboard facesheet 112 or outboard facesheet 114, or upon a desired material property field of the sandwich structure panel. That is, the various lengths of composite tape may be selected and oriented relative to one another such that a desired material property field is produced. This may include orienting the various lengths of composite tape such that they define skew angles that create the desired material property field and/or selecting the various lengths of composite tape such that they define respective fiber axis directions that create the desired material property field of web 118.

This variation in material properties with direction within sandwich panel 110 may be described, quantified, and/or represented by a material property field for facesheets 112, 114 and the plurality of web structures and may be determined and/or measured in any suitable manner. For example, facesheets 112, 114 may be formed and/or constructed and the material properties thereof may be measured. For another example, sandwich panel 110 may be modelled, such as via any suitable mathematical modeling and/or finite element analysis, to establish, estimate, and/or determine the desired material property field.

In some examples, the material property field of web 118 may correspond to the material property field of facesheets 112, 114 in any suitable direction and/or directions. Additionally or alternatively, the material property field of the web may correspond to the material property field of the facesheets at faying surfaces 126 and/or at a plurality of discrete locations within feet 122, 124.

Any suitable material property field of facesheets 112, 114 may be determined. The determined material property field may then be utilized to establish, estimate, quantify, and/or determine one or more forces that may be applied to web 118, to establish and/or select the fiber axis direction within a given length of composite tape of web 118 (such as by selecting the skew angle among the plurality of lengths of composite tape), to establish and/or select the relative orientation among the plurality of lengths of composite tape of web 118, and/or to establish and/or select a desired material property field of web 118. Examples of material property fields include a stiffness field, a coefficient of thermal expansion field, a stress field, a strain field, and/or a resin shrinkage field.

Any suitable properties of expected loading on sandwich panel 110 may be considered. The expected loading may be utilized to establish, estimate, quantify, and/or determine one or more forces that may be applied to web 118, to establish and/or select the fiber axis direction within a given length of composite tape of web 118 (such as by selecting the skew angle among the plurality of lengths of composite tape), to establish and/or select the relative orientation among the plurality of lengths of composite tape of web 118, and/or to establish and/or select a desired material property field of web 118.

Figure 6:
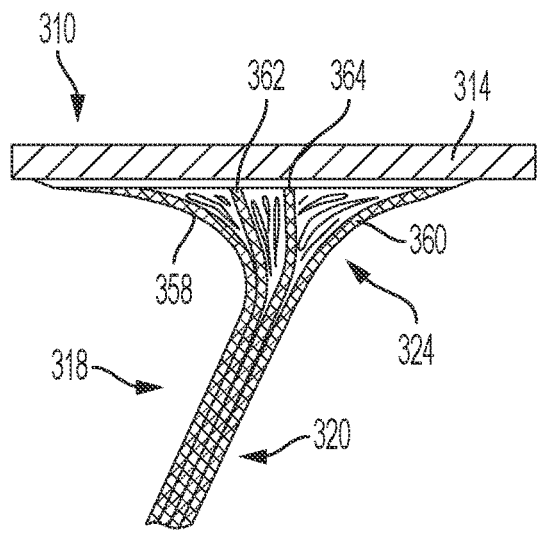
FIG. 6 is a cross-sectional view of a portion of another illustrative web core sandwich structure, depicting the pultruded composite structure of a foot portion of a web.
Figure 7:
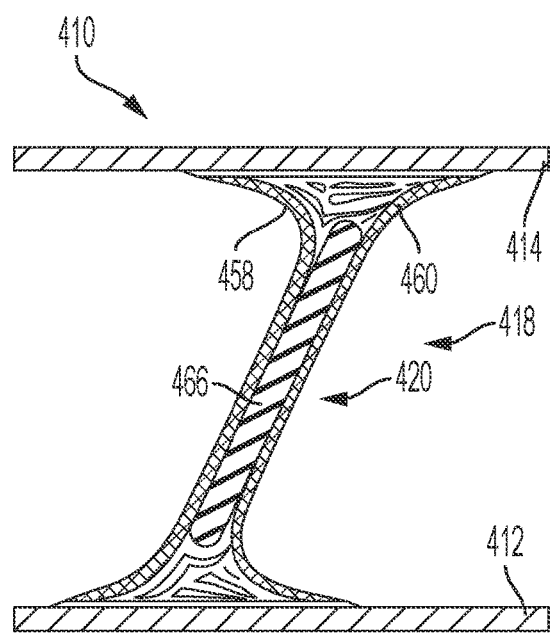
FIG. 7 is a cross-sectional view of a portion of another illustrative web core sandwich structure, depicting the pultruded composite structure of a web.

FIGS. 5-7 show three different examples of a composite structure of a web. These examples are illustrative and non-exclusive. Any pultruded composite structure may be used, and configured as discussed above to create desired properties of a web and/or a sandwich panel.

As shown in FIG. 5, web 118 includes a first outer ply 158 and a second outer ply 160. Leg 120 of the web includes only the first and second outer plies, while each of inboard foot 122 and outboard foot 124 includes additional plies between the outer plies. In some examples, outer plies 158, 160 may comprise a different material from the remainder of the plies. Such differentiation may allow good stiffness of leg 120 and good adhesion of the foot portions. In the present example, all plies of web 118 comprise a single composite tape material.

Web 118 may be described as configured to act similarly to a combination of two stiffeners and radius fillers or noodles. That is, the web may exhibit properties of both a stiffener and a radius filler. Those portions of feet 122, 124 between the outer plies may be configured similarly to pultruded noodles. However, in contrast to fluted core or other similar sandwich structures, the noodle portion may be pultruded as part of the single monolithic structure of web 118.

FIG. 6 shows a portion of an illustrative sandwich panel 310, including an outboard foot 324 of a web 318 and an outboard facesheet 314. Web 318 includes a first outer ply 358 and a second outer ply 360. The web further includes a first inner ply 362 and a second inner ply 364. A leg 320 of the web includes only the outer plies 358, 360 and inner plies 362, 364. Foot 324 includes additional plies, such that the inner and outer plies are spaced from one another, with inner plies 362, 364 extending approximately perpendicular to outboard facesheet 314. Including inner plies 362, 364 in leg 320 and extending the plies through foot 324 may increase stiffness and strength of web 318.

FIG. 7 shows a portion of an illustrative sandwich panel 410, including a web 418 between an inboard facesheet 412 and an outboard facesheet 414. Web 318 includes a first outer ply 458 and a second outer ply 460. A leg 420 of the web includes a core 466, sandwiched between the first and second outer plies. The core may include any appropriate material. In the present example, core 466 includes a stiff, light-weight foam. Web 418 may be advantageous for applications including heavy loading, such as launch vehicles, and may allow a thick panel at a low weight. For example, a panel as thick as four to five inches may be produced without prohibitive weight.

Figure 8:
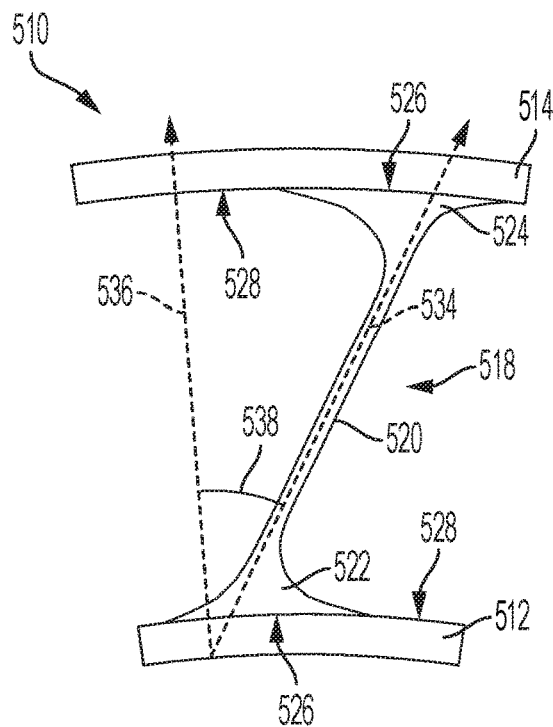
FIG. 8 is an elevation view of a portion of an illustrative curved web core sandwich structure.

FIGS. 1-7 show illustrative sandwich panels which all include planar facesheets. In general, a sandwich panel according to the present disclosure may include facesheets of any contour and/or geometry. FIG. 8 shows a portion of an illustrative sandwich panel 510 which includes curved facesheets.

Sandwich panel 510 includes an inboard facesheet 512 and an outboard facesheet 514. The panel includes a plurality of web structures, of which a web 518 is depicted in FIG. 8. Inboard facesheet 512 and outboard facesheet 514 are concentrically curved about a shared center. In the present example, the curvature is perpendicular to a longitudinal or pultrusion axis of web 518.

Web 518 includes a main support portion or leg 520. The leg tapers out to form an inboard foot 522 at a first end and an outboard foot 524 at a second, opposite end. Each foot 522, 524 has a distal surface or faying surface 526. Faying surface 526 of inboard foot 122 is concave to conform to an inner surface 528 of inboard facesheet 512. Faying surface 526 of outboard foot 124, however, is convex to conform to an inner surface 528 of outboard facesheet 514.

Web 518 flares out from leg 520 through feet 522, 524 to faying surfaces 126. Leg 520 defines a primary web axis 534 of the web. Web 118 is inclined relative to a radial direction 536 of facesheets 512, 514. Primary web axis 534 forms a web angle 538 with radial direction 536. Web 518 may be described as off-radial relative to the facesheets. Web angle 538 may be any oblique angle. Preferably, the angle may be selected to provide optimum structural performance of sandwich panel 510. For many applications, an angle between 10 and 30 degrees may result in the best performance. Web angle 538 may also be selected according to a degree of curvature of facesheets 512, 514, and may vary across sandwich panel 510 according to variations in curvature.

B. Illustrative Method

Figure 9:
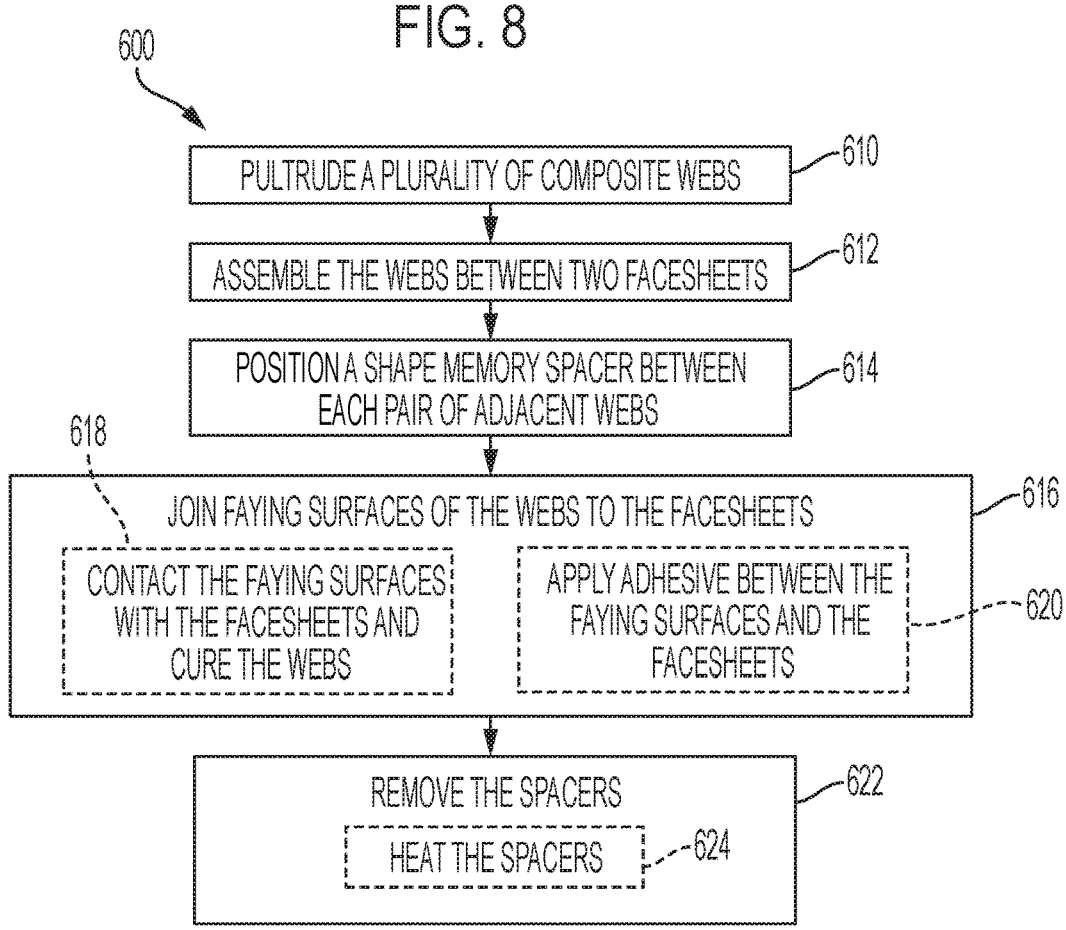
FIG. 9 is a flow chart depicting steps of an illustrative method for manufacturing a web core sandwich structure according to the present teachings.

This section describes steps of an illustrative method 600 for manufacturing a web core sandwich panel; see FIG. 9. Aspects of sandwich structures and webs described above may be utilized or referenced in the method steps described below. Where appropriate, reference may be made to components and systems that may be used in carrying out each step. These references are for illustration and are not intended to limit the possible ways of carrying out any particular step of the method.

FIG. 9 is a flowchart illustrating steps performed in an illustrative method, and may not recite the complete process or all steps of the method. Although various steps of method 600 are described below and depicted in FIG. 9, the steps need not necessarily all be performed, and in some cases may be performed simultaneously or in a different order than the order shown.

At step 610, the method includes pultruding a plurality of composite webs. Each web may be formed from a plurality of lengths of composite tape, plies of a composite material, and/or fiber tows. The tape, plies, and/or tows may be passed through a die configured to compress the plurality of lengths of material into a desired cross-sectional shape, with the plurality of lengths of material in a desired relative orientation. Pultrusion of each web structure may be performed in a single pass.

Pultruding a web may include receiving a plurality of lengths of composite tape into a plurality of first openings on a first side of a forming die, pressing the plurality of lengths of composite tape against one another within the forming die to form the web, and withdrawing the web from a single second opening on a second side of the forming die. Combing the plurality of lengths of composite tape in this manner may be a substantially continuous process, in which the receiving, pressing, and withdrawing are performed concurrently and/or simultaneously. In some examples, pultrusion of a web may be performed according to the teachings of US Patent Publication No. 2018/0311913A1, issued as U.S. Pat. No. 10,864,687 on Dec. 15, 2020, which is hereby incorporated by reference.

Alternatively or additionally, pultruding a web may include feeding each length of composite tape through a guide. The guides for each length of tape may be integrated into a guide plate, proximate a forming die, the guide plate being configured to position the composite tapes as desired relative to one another. The forming die may include a single aperture extending from a first side to a second side of the die, the aperture having internal surfaces radiused appropriately to assist feeding of the composite tapes through the aperture into a desired forming cross-section of the aperture, without scraping of material over edges of the aperture.

Each pultruded web may include reinforcing fibers in a matrix material such as a resin, and the web may be pultruded such that the reinforcing fibers are oriented to produce a desired material property field of the web. Examples of material property fields include a stiffness field, a coefficient of thermal expansion field, a stress field, a strain field, and/or a resin shrinkage field.

In some examples, the method may include evaluating or otherwise determining a material property field of one or more facesheets and/or facesheet materials. In some examples, the method may include modeling or otherwise forecasting properties of the loads which will be applied to the manufactured sandwich panel. Examples of load properties include strength, direction, type, duration, and distribution.

The determined material property field of the facesheets and/or the forecasted load properties may be utilized to establish and/or select a fiber axis direction within one or more given lengths of composite material of each web (such as by selecting a skew angle among a plurality of lengths of composite tape), to establish and/or select the relative orientation among the plurality of lengths of composite material of the web, and/or to establish and/or select a desired material property field of the web.

Establishing and/or selecting the relative orientation among the plurality of lengths of composite material of the web may be accomplished at least in part by design of the forming die utilized in the pultrusion of the web. The forming die may define a plurality of channels extending from a plurality of first openings to a single second opening. The relative orientation among the plurality of channels may determine the relative orientation among the plurality of lengths of composite material of the web and may therefore be selected to achieve the desired relative orientation among the plurality of lengths of composite material.

Step 612 of method 600 includes assembling the webs between two facesheets. Each facesheet may comprise a thin layer of stiff material, such as metal, plastic, and/or composite laminate. Composite materials such as fiber reinforced plastics and/or laminates may provide desired stiffness with minimal weight. Once assembled, each web may extend between the two facesheets. Each web may extend at an oblique angle relative to the facesheets and/or may be off-normal or off-radial relative to the facesheets.

Assembly of the webs and facesheets may be performed at any stage of curing of the webs and facesheets. For example, the webs may be applied directly from a forming die onto a fully cured facesheet. A second fully cured facesheet may be positioned on the webs, once all of the webs have been pultruded and applied. For another example, the webs and facesheets may each be partially cured prior to assembly. For another example, the webs may be fully cured prior to assembly and one or both of the facesheets may be formed by Automated Tape Placement (ATP) on the webs and tooling. Preferably, at each interface between a facesheet and a web, one or both may be partially cured or uncured, to allow conforming of the parts and improve joint strength along the bondline.

In some examples, the assembly step may include shaping and/or contouring one or more of the webs. For example, an uncured or partially cured web may retain some degree of flexibility and may conform to the curvature of a facesheet when applied to the facesheet. For another example, the webs may be applied in a converging or diverging pattern, with a curvature in a plane of the facesheets. Such curvature and/or convergence may be advantageous for construction of panels having complex geometries or panels which may be exposed to non-uniform loading. For example, a panel designed for use in an aircraft wing may have an airfoil contour and may be configured to accommodate the change in aerodynamic loads along the length of the wing.

At step 614, the method includes positioning a shape memory spacer between each pair of adjacent webs. Steps 614 and 612 may be performed concurrently, with the spacers being positioned as the webs and facesheets are assembled. For example, the webs and spacers may be positioned on a first one of the facesheets, and the second facesheet may be assembled with the webs once positioning is complete. In some examples, the spacers may be positioned between webs prior to assembly with the facesheets. In other words, step 614 may be performed prior to step 612. The spacers may be elongate tooling such as mandrels, bladders comprised of a shape memory polymer material. Each spacer may extend between two webs, parallel to a longitudinal extent of the webs, and may be shaped such that the web structures are supported in a desired geometric configuration. For example, the tooling may have an isosceles trapezoidal cross-sectional shape such that the web structures extend at alternating web angles.

At room temperature and/or an expected assembly temperature, the spacers may have a permanent shape configured to support the web structures in the desired geometric configuration. Above a transition temperature, the spacers may become flexible such that the spacers can be deformed to a temporary shape and/or shapes to allow removal from the web core sandwich structure. The transition temperature of the shape memory polymer material may be selected according to a cure temperature of the composite materials of the webs and/or facesheets. Other properties of the spacers, such as wall thickness and/or internal geometry may be selected according to desired stiffness during assembly or curing, and/or according to desired flexibility during removal.

Step 616 includes joining faying surfaces of the webs to the facesheet. For each web, a first faying surface may be joined to a first of the facesheets and a second faying surface at an opposite end of the web may be joined to a second of the facesheets. The web structure may be joined to the facesheets by any effective means.

For example, optional step 618 includes contacting each faying surface with an inner surface of the corresponding facesheet, and curing the web structures and the facesheets together. For another example, optional step 620 includes applying an adhesive between the faying surfaces and the facesheets. For instance, the adhesive may be a film adhesive pultruded as part of the web structure, or may be a liquid adhesive applied subsequent to the pultrusion of the web structure.

In some examples, method 600 may include curing the assembled sandwich panel. Curing of the pultruded composite material of the webs may produce a plurality of monolithic web structures. That is, each web structure may consist of a single unit formed or composed of material without joints or seams. Each web structure may also be described as unitary or as a single piece.

Depending on the selected transition temperature of the shape memory spacers, the spacers may act as mandrels or bladders during curing. That is, shape memory spacers having a transition temperature higher than a peak temperature of the curing process may remain rigid throughout the curing period. Shape memory spacers having a transition temperature at or below the peak temperature of the curing process may become flexible during curing. To maintain the shape of the spacers and support of the webs and facesheets during curing, such spacers may be left open to air pressure of curing equipment such as an autoclave.

Step 622 includes removing the shape memory spacers. Shape memory spacers having a transition temperature at or below the peak temperature of the curing process may remain flexible for a period of time after curing, allowing immediate deformation and extraction. Shape memory spacers having a transition temperature above the peak temperature of the curing process and/or having cooled below the transition temperature during or after the curing process may require heating prior to removal.

Optional step 624 includes heating the spacers. Heat may be applied by any effective means, including but limited resistive heaters inserted through the hollow spacers and/or heated air blown into the spacers. Heat may be applied to the spacers such that a majority of the heat is transmitted to the spacers, with limited heating of the surrounding sandwich panel. The spacers may be heated sufficiently to raise the temperature of the shape memory polymer material above the transition temperature, thereby facilitating deformation and extraction of the spacers from the sandwich panel.

C. Illustrative Method

Figure 10:
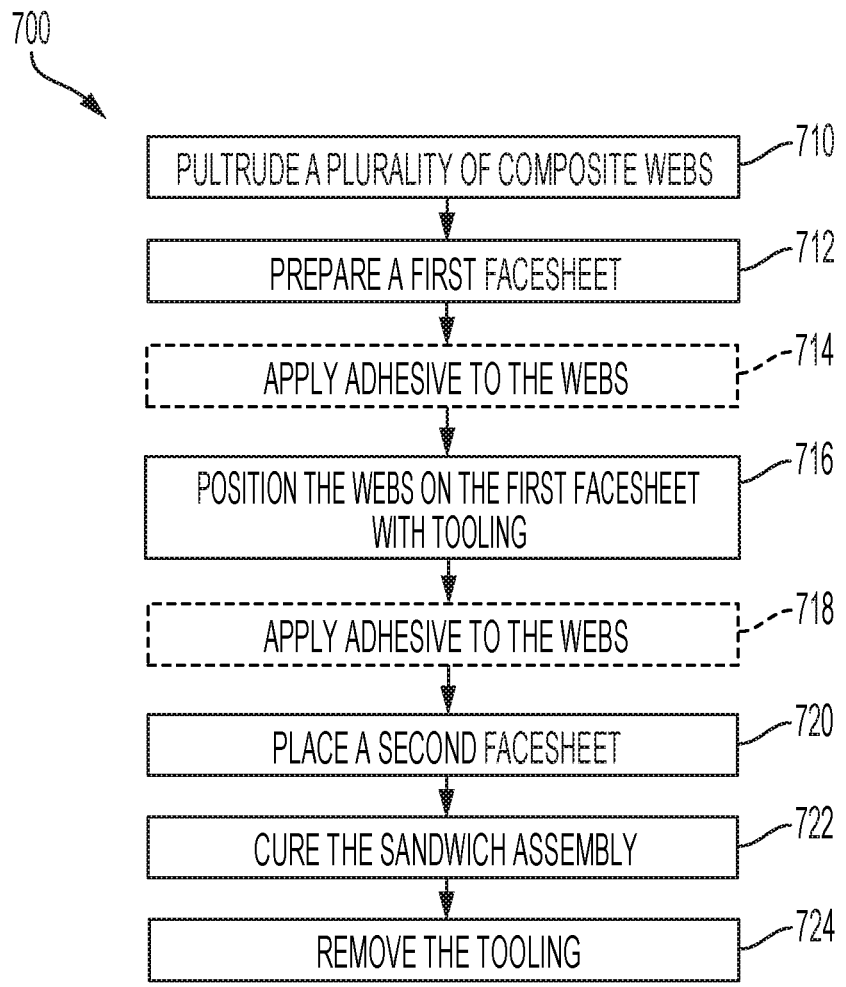
FIG. 10 is a flow chart depicting steps of another illustrative method for manufacturing a web core sandwich structure.

This section describes steps of an illustrative method 700 for manufacturing a web core sandwich panel; see FIG. 10. Aspects of sandwich structures and webs described above may be utilized or referenced in the method steps described below. Where appropriate, reference may be made to components and systems that may be used in carrying out each step. These references are for illustration and are not intended to limit the possible ways of carrying out any particular step of the method.

FIG. 10 is a flowchart illustrating steps performed in an illustrative method, and may not recite the complete process or all steps of the method. Although various steps of method 700 are described below and depicted in FIG. 10, the steps need not necessarily all be performed, and in some cases may be performed simultaneously or in a different order than the order shown.

At step 710, the method includes pultruding a plurality of composite webs. Each web may be formed from a plurality of lengths of composite tape, plies of a composite material, and/or fiber tows. The tape, plies, and/or tows may be passed through a die configured to compress the plurality of lengths of material into a desired cross-sectional shape, with the plurality of lengths of material in a desired relative orientation. Each web may be at any stage of cure, including uncured or green, partially cured or C-staged, or fully cured.

Step 712 of the method includes preparing a first facesheet. The first facesheet may comprise a thin layer of a composite material such as a laminate. The first facesheet may also be at any stage of cure. Preferably, either the plurality of composite webs or the first facesheet or both, may be either uncured or only partially cured. The webs or facesheet may therefore retain pliability and conform to the other for a stronger bond.

Optional step 714 of the method includes applying adhesive to the webs. Adhesive may be applied to a first faying surface of each web, where the faying surface contacts the first facesheet once assembled. Any effective adhesive may be used, including an adhesive film. Step 714 may be included when the webs and first facesheet are highly cross-linked. The step may be omitted when the webs and first facesheet are at a sufficiently low level of cross-linking to allow co-curing.

Step 716 of the method includes positioning the webs on the first facesheet, with tooling. Webs and tooling may be alternated on the first facesheet, to obtain a correct spacing. Tooling may include, for instance, mandrels or bladders of a shape memory polymer material.

Optional step 718 of the method includes applying adhesive to the webs. Adhesive may be applied to a second faying surface of each web, where the faying surface contacts a second facesheet once assembled. Any effective adhesive may be used, including an adhesive film. Step 718 may be included when the webs and second facesheet are highly cross-linked. The step may be omitted when the webs and second facesheet are at a sufficiently low level of cross-linking to allow co-curing.

Step 720 includes placing a second facesheet on the sandwich assembly. The second facesheet may contact the second faying surface of each web and be adjacent to or contact supporting surfaces of the tooling. The second facesheet may comprise a thin layer of a composite material such as a laminate. The second facesheet may be at any stage of cure. Preferably, either the webs or the second facesheet or both, may be either uncured or only partially cured. The webs or facesheet may therefore retain pliability and conform to the other for a stronger bond.

Step 722 includes curing the sandwich assembly. The assembly, including the first facesheet, the plurality of composite webs, and the second facesheet, may be cured by any method appropriate to the composite materials of the webs and facesheets. Step 724 includes removing the tooling. For shape memory polymer tooling, direct or indirect application of heat may be used to facilitate removal.

Illustrative Combinations and Additional Examples

This section describes additional aspects and features of web core sandwich structures, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A panel, comprising:
a first facesheet and a second facesheet,
a plurality of pultrusion-formed web structures, each pultrusion-formed web structure having a middle support portion, a first end portion, and a second end portion, the first end portion of each web structure being attached to the first facesheet and the second end portion of each web structure being attached to the second facesheet, wherein the middle support portion and the first and second end portions of each web structure form a single monolithic structure.

A1. The panel of A0, wherein each of the first and second end portions flares outward to a faying surface configured to be joined to one of the facesheets.

A2. The panel of A1, wherein each faying surface is attached to the corresponding facesheet by an adhesive.

A3. The panel of A1 or A2, wherein each faying surface is attached to the corresponding facesheet by co-curing.

A4. The panel of any of A1-A3, wherein the faying surface of the first end portion of each web structure is contoured to conform to a curvature of the first facesheet.

A5. The panel of any of A0-A4, wherein adjacent web structures are separated from each other, forming opposite sides of a trapezoidal compartment between the first and second facesheets.

A6. The panel of A5, further comprising:

a pressurized bladder in the trapezoidal compartment configured to support the web structures during a curing process.

A7. The panel of any of A0-A6, wherein each web structure is off-normal to the first facesheet and the second facesheet.

A8. The panel of A7, wherein each web structure is between 10 degrees and 30 degrees off-normal to each facesheet.

A9. The panel of any of A0-A8, wherein each facesheet is connected to each web structure along a joinder line, and on each facesheet the distance between adjacent joinder lines alternates between a first distance and a second distance, the first distance being longer than the second distance.

A10. The panel of any of A0-A9, wherein each pair of adjacent web structures has reflective symmetry.

B0. A pultrusion formed web structure, comprising:

a middle support portion having uniform thickness, a first foot portion and a second foot portion flaring outward from opposite ends of the middle support portion, wherein the middle support portion and the first and second foot portions form a single continuous monolithic unit.

B1. The pultrusion formed web structure of B0, wherein the middle support portion, first foot portion, and second foot portion form a single composite unit.

B2. The pultrusion formed web structure of B0 or B1, wherein each of the first and second foot portions are configured for bonding to a facesheet of a sandwich structure.

B3. The pultrusion formed web structure of B2, wherein each of the foot portions includes a faying surface, the faying surfaces being contoured such that the middle portion is off-normal to each of the facesheets when the foot portions are bonded to the facesheets.

B4. The pultrusion formed web structure of any of B0-B3, wherein the middle support portion is planar.

C0. An intermediate sandwich assembly comprising:

a first facesheet, second facesheet, and a plurality of web structures connecting the facesheets, wherein the facesheets and web structures create a plurality of trapezoidal compartments, and wherein each trapezoidal compartment contains a shape memory spacer supporting adjacent web structures during a curing process.

C1. The intermediate assembly of C0, wherein each shape memory spacer has a trapezoidal shape.

C2. The intermediate assembly of C0 or C1, wherein the shape memory spacer transitions from a rigid state to a flexible state above a transition temperature.

C3. The intermediate assembly of C2, wherein the transition temperature is less than a cure temperature of the web structures.

C4. The intermediate assembly of C2 or C3, wherein the transition temperature is greater than a cure temperature of the web structures.

D0. A method of manufacturing a sandwich panel, comprising:

pultruding a plurality of composite web structures, each web structure having a middle support portion, a first flared end portion, and a second flared end portion, each of the first and second end portions having a continuous faying surface, joining the faying surface of the first end portion of each web structure to a first facesheet, and joining the faying surface of the second end portion of each web structure to a second facesheet.

D1. The method of D0, further comprising:

positioning a shape memory spacer between each pair of adjacent web structures, before joining the faying surfaces of the web structures to the facesheets.

D2. The method of D1, further comprising:

heating the shape memory spacer and removing the shape memory spacer from between the facesheets.

D3. The method of D1 or D2, further comprising:

curing the sandwich panel, and removing the shape memory spacer from between the facesheets before the shape memory spacer has cooled below a transition temperature.

D4. The method of any of D0-D3, wherein joining the faying surface of the first end portion of each web structure to a first facesheet includes contacting the faying surfaces with the first facesheet and curing the web structures.

D5. The method of any of D0-D4, wherein joining the faying surface of the first end portion of each web structure to a first facesheet includes applying an adhesive between the faying surfaces and the first facesheet.

Advantages, Features, and Benefits

The different examples of the web core sandwich structures described herein provide several advantages over known sandwich-structure composite materials. For example, illustrative examples described herein have improved strength to weight ratios.

Additionally, and among other benefits, illustrative examples described herein allow architectural design flexibility for complex structures.

Additionally, and among other benefits, illustrative examples described herein allow a direct load path through the webs into the facesheets.

Additionally, and among other benefits, illustrative examples described herein provide greater toughness than honeycomb sandwich structures, with wider bond lines.

Additionally, and among other benefits, illustrative examples described herein are more cost effective than fluted sandwich structures, requiring less assembly labor and eliminating radius fillers.

No known system or device can perform these functions, particularly with such material property design flexibility. Thus, the illustrative examples described herein are particularly useful for strong, low-cost, composite panels. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A panel, comprising:
a first facesheet and a second facesheet,
a plurality of web structures, each web structure having a middle support portion, a first end portion, and a second end portion, the first end portion of each web structure being attached to the first facesheet and the second end portion of each web structure being attached to the second facesheet,
wherein the middle support portion and the first and second end portions of each web structure form a single monolithic structure, comprising a composite material.

2. The panel of claim 1, wherein each of the first and second end portions flares outward to a faying surface configured to be joined to one of the facesheets.

3. The panel of claim 2, wherein each faying surface is attached to the corresponding facesheet by an adhesive.

4. The panel of claim 2, wherein each faying surface is attached to the corresponding facesheet by co-curing.

5. The panel of claim 2, wherein the faying surface of the first end portion of each web structure is contoured to conform to a curvature of the first facesheet.

6. The panel of claim 1, wherein adjacent web structures are separated from each other, forming opposite sides of a non-rectangular trapezoidal compartment between the first and second facesheets.

7. The panel of claim 6, further comprising:
a pressurized bladder in the trapezoidal compartment configured to support the web structures during a curing process.

8. The panel of claim 1, wherein each web structure is off-normal to the first facesheet and the second facesheet.

9. The panel of claim 8, wherein each web structure is between 10 degrees and 30 degrees off-normal to each facesheet.

10. The panel of claim 1, wherein each facesheet is connected to each web structure along a joinder line, and on each facesheet the distance between adjacent joinder lines alternates between a first distance and a second distance, the first distance being longer than the second distance.

11. A method of manufacturing a sandwich panel, comprising:
pultruding a plurality of composite web structures, each web structure having a middle support portion, a first flared end portion, and a second flared end portion, each of the first and second end portions having a continuous faying surface,
joining the faying surface of the first end portion of each web structure to a first facesheet, and joining the faying surface of the second end portion of each web structure to a second facesheet,
wherein the middle support portion and the first and second flared end portions of each composite web structure form a single monolithic structure.

12. The method of claim 11, further comprising:
positioning a shape memory spacer between each pair of adjacent web structures, before joining the faying surfaces of the web structures to the facesheets.

13. The method of claim 12, further comprising:
heating the shape memory spacer and removing the shape memory spacer from between the facesheets.

14. The method of claim 12, further comprising:
curing the sandwich panel, and
removing the shape memory spacer from between the facesheets before the shape memory spacer has cooled below a transition temperature.

15. The method of claim 11, wherein joining the faying surface of the first end portion of each web structure to a first facesheet includes contacting the faying surfaces with the first facesheet and curing the web structures.

16. The method of claim 11, wherein joining the faying surface of the first end portion of each web structure to a first facesheet includes applying an adhesive between the faying surfaces and the first facesheet.

17. The panel of claim 1, wherein the composite material includes reinforcing fibers in a matrix material.

18. The panel of claim 1, wherein the monolithic structure includes a plurality of lengths of composite material fused together.

19. The panel of claim 1, wherein the middle support portion of the web structure includes two composite plies, each of the composite plies extending into the first end portion and being fused with other composite material of the first end portion.

20. A panel, comprising:
a first facesheet and a second facesheet,
a plurality of web structures, each web structure having a middle support portion, a first end portion, and a second end portion, the first end portion of each web structure contacting the first facesheet and the second end portion of each web structure contacting the second facesheet, and
wherein each web structure is a monolithic structure comprised of a plurality of lengths of partially cured composite prepreg material pressed together, material of the middle support portion being joined to material of the first and second end portions by matrix material.

* * * * *